United States Patent [19]
Yoshida

[11] 4,240,107
[45] Dec. 16, 1980

[54] APPARATUS AND METHOD FOR PATTERN INFORMATION PROCESSING

[75] Inventor: Hajime Yoshida, Chofu, Japan

[73] Assignee: Hajime Industries, Ltd., Tokyo, Japan

[21] Appl. No.: 22,494

[22] Filed: Mar. 21, 1979

[51] Int. Cl.³ .............................................. H04N 7/18
[52] U.S. Cl. ................................. 358/93; 235/92 PC; 340/146.3 AG; 358/96; 358/106; 358/280
[58] Field of Search ..................... 358/81, 93, 96, 280, 358/106; 235/92 AE, 92 CA, 92 PC; 340/146.3 AG; 179/1 UL, 1 SP

[56] References Cited

U.S. PATENT DOCUMENTS

| | | |
|---|---|---|
| 3,662,341 | 5/1972 | Baumgartner et al. ... 340/146.3 AG |
| 3,736,375 | 5/1973 | Parnet ..................................... 358/96 |
| 3,930,230 | 12/1975 | Stephens ........................... 235/92 PC |
| 3,932,839 | 1/1976 | Stephens ........................... 235/92 PC |

Primary Examiner—Robert L. Griffin
Assistant Examiner—Joseph A. Orsino, Jr.
Attorney, Agent, or Firm—Thomas R. Morrison

[57] ABSTRACT

A pattern information processing method is disclosed in which a video signal of an object from a television camera is divided at a plurality of different threshold levels, a clock pulse is gated with the divided video signals, the number of gated clock pulses by each of the divided video signals is counted, and a number of series is provided from the counted numbers of the clock pulses. This series is used to represent a pattern of the object.

Further, a pattern information processing apparatus is disclosed which has a television camera providing a video signal of an object, devices producing plural threshold levels different from one another, circuits dividing the video signal by the plurality of different threshold levels, circuits gating a clock pulse from a clock pulse generator by the divided video signals, and counters counting the numbers of the gated clock pulses to provide a number series which represents the object.

4 Claims, 6 Drawing Figures

FIG. 2B $S_C$

APPARATUS AND METHOD FOR PATTERN INFORMATION PROCESSING

BACKGROUND OF THE INVENTION

1. Field of the Invention

The present invention relates generally to a pattern information processing method and an apparatus for carrying out the above method.

2. Description of the Prior Art

In the art of inspecting objects there have been proposed various kinds of pattern information processing methods and apparatus. According to the prior art methods, the pattern information of an object to be inspected or recognized is converted into two values of black and white as data representing the shape, area and so on of the object and this data is compared with the data of a reference body which is preliminarily set to judge whether the object is good or not.

In fact, however, such practical objects, which can be divided into two values of black and white clearly, are few. In general, objects have a certain degree of light and shade in addition to black and white. Therefore, the prior art method is not satisfactory to inspect an object which has a complicated pattern.

In the case where the prior art pattern information processing method uses a television camera or the like, its picture screen is divided into, for example, 500×500 picture elements, the degree of light and darkness of an image projected onto each of the picture elements is converted by an A/D (analog to digital) converter into a digital value as data, and this data is processed by a computer or the like to extract the features of the object which is picked up by the television camera. In such case, the amount of the data becomes massive and much time is required to process such massive amount of data. There also are methods of inspecting for flaws or the like of an article, whereby the picture screen of a television camera is not divided into a plurality of picture elements but a certain value of threhold level is set, and then as an example only the part of the video signal from the television camera, which video signal that exceeds the threshold value, is converted into two values, and the values are counted to represent the feature of the object or to detect a flaw of the object.

The above prior art method will be described with reference to FIG. 1. In this case, a single threshold value S1 is set and the inspection of an object is conducted by judgement of whether or not a video signal S2 from a television camera which picks up the object to be inspected exceeds the threshold value S1. This method is effective for inspecting objects or flaws which are simple in pattern but are not suitable to inspect objects with complicated patterns.

OBJECTS AND SUMMARY OF THE INVENTION

Accordingly, an object of this invention is to provide a novel method of processing an information pattern.

Another object of the invention is to provide a method of processing an information pattern free from the defects inherent to the prior art methods.

A further object of the invention is to provide a method of processing an information pattern which is suitable to be used for inspecting a flaw of an object, recognizing a pattern and so on.

A still further object of the present invention is to provide an apparatus for achieving the above method of the invention.

According to an aspect of the present invention, a method of processing a pattern information is provided which comprises the steps of picking up an object by an image sensor to produce a video signal corresponding to said object, dividing said video signal into a plurality of threshold levels which are different from one another, gating a clock pulse train with said divided video signals to produce clock pulse trains corresponding to said plurality of threshold levels, and counting said clock pulse train to provide a series which represents a pattern of said picked up object.

According to another aspect of the present invention a pattern information processing apparatus is provided which comprises an image sensor picking up an object to produce a video signal of said object, a device for providing a plurality of threshold levels which are different from one another, a circuit for dividing said video signals by said plurality of threshold levels to produce gate signals corresponding to said video signals divided by said plurality of threshold levels, a generator for producing a clock pulse signal, an AND-circuit for gating said clock pulse signal by each of said gate signals, and a counter for counting said clock pulse signals from said AND-circuit and providing a series which represents said picked-up object.

The other objects, features and advantages of the present invention will be apparent from the following description taken in conjunction with the accompanying drawings.

BRIEF DESCRIPTION OF THE DRAWINGS

FIGS. 2A, 2B, 2C and 2D are respectively waveform diagrams used for explaining an example of the pattern information processing method according to the present invention.

DESCRIPTION OF THE PREFERRED EMBODIMENTS

An example of the pattern information processing method according to the present invention will be hereinbelow described with reference to FIGS. 2A, 2B, 2C and 2D.

Figure 2A:
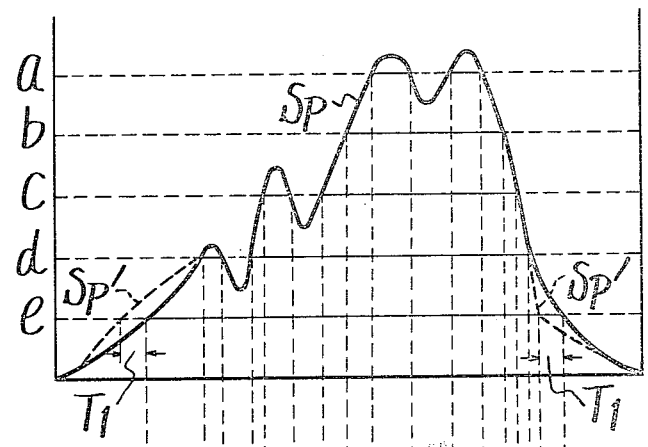

In FIG. 2A, reference SP designates a video signal from an image sensor such as a television camera which picks up an object or article to be recognized or inspected. In this case, the video signal SP corresponds to one horizontal interval of the television camera. In the invention, a plurality of threshold values or levels, in the illustrated example, five threshold values a, b, c, d and e are set which are different from one another in level and which fall within the level of the video signal SP, as shown in FIG. 2A. In this case, it is noted that the number of the threshold levels and the interval (level difference) between adjacent threshold values do not need to be limited to a special number and a special value but can be selected arbitrarily.

Figure 2C:
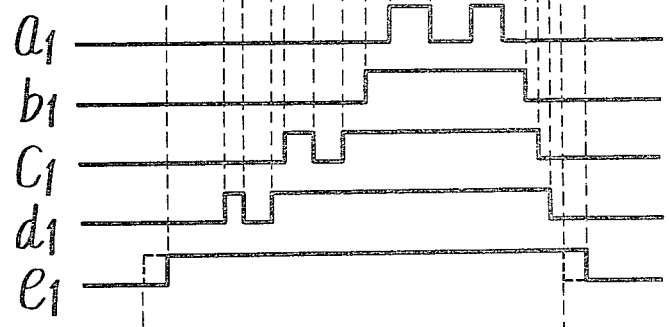

If the parts of the video signal SP, which intersect the respective threshold levels a to e, are extracted, waveforms a1, b1, c1, d1 and e1 such as shown in FIG. 2C are obtained.

Figure 2D:
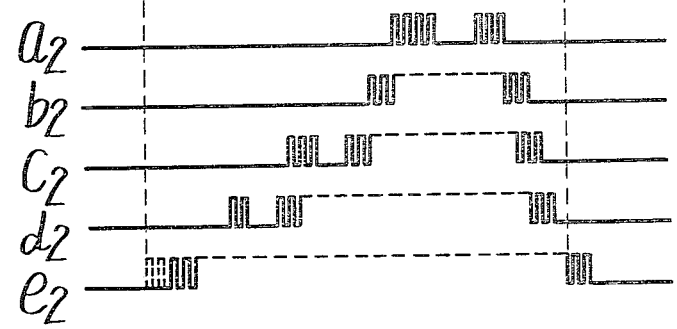

When a clock pulse train SC with a constant frequency, as shown in FIG. 2B, and the signals a1 to e1 shown in FIG. 2C are and-gated, signals a2, b2, c2, d2 and e2, such as shown in FIG. 2D, are obtained.

The number of the clock pulses SC in each of the signals a2 to e2 is counted to make a series from the numbers of the clock pulses SC in the respective signals a2 to e2, and the series is used to represent a pattern or feature of the video signal SP and hence the object corresponding to the video signal SP.

When the threshold levels are set as a to e and the frequency of the clock pulse train SC is selected constant as shown in FIG. 2B, the numbers of the clock pulses in the respective signals a2 to e2 become $4+3=7$, 14, $3+17=20$, $2+22=24$ and 34, respectively. Therefore, the number series corresponding to or representing the video signal SP shown in FIG. 2A is expressed as $\{7, 14, 20, 24, 34\}$.

When objects or articles which are picked up by the television camera are different from one another, video signals derived from the television camera are correspondingly different under this invention method. Thus, the number series provided by processing the video signals in accordance with the method of the invention become different corresponding to the objects or articles. That is, if the video signals corresponding to the different articles or objects are processed by the above method to provide respective number series, the respective objects or articles can be represented by their own number series.

A description will be now given on the case where the method of the invention is employed to recognize an article (or pattern) by way of an example. In this case, a reference article (or pattern) is picked up by a television camera, the video signal therefrom is processed by the method described above to provide a number series corresponding to the reference article, and then this number series is memorized in a computer as the reference series pattern. Then, an article to be recognized is picked up by the television camera, a series pattern corresponding to the article to be recognized is similarly provided, and then this series pattern is compared by the computer with the reference series pattern which is previously memorized therein to discriminate whether both the series patterns are coincident with each other or not and hence whether the article to be recognized is same as the reference article or not.

It will be apparent that the method of the invention can be used, in addition to the above pattern recognition, to inspect whether an object or article is good or not, whether there is a flaw in goods or not, shape of an object and to measure an area of an object. In such a case, the number and level of the threshold levels are varied in accordance with the articles to be inspected to provide the necessary number series patterns to achieve the desired purpose.

According to the method of the invention set forth above, since the number and so on of the threshold levels are varied in accordance with the patterns of articles to be recognized or inspected to provide corresponding series patterns, even if the articles are complicated in pattern, they can be recognized or inspected accurately.

When a video signal SP' is different from the reference video signal SP as indicated by the dotted lines in FIG. 2A, the interval in which the video signal intersects the threshold level e is different beteween the video signals SP and SP'. That is, the video signal SP' crosses the threshold level e faster than the video signal SP by a time period T1 at their positive-going portion, and similarly the video signal SP' crosses the threshold level e faster than the video signal SP by the same time period T1 at their negative-going portion. Therefore, in this case, as shown in FIG. 2C by the dotted-lines, the length (time period) of the high, or positive, portion of waveform e1 is not changed between the video signals SP and SP'. As a result, as shown in FIG. 2D by the dotted lines, the number of the clock pulses contained in the waveform e2 is not changed between the video signals SP and SP' and hence the series pattern representing the video signal SP' is same as that representing the reference video signal SP. Thus, although the video signal SP' is different from the reference video signal SP, they are judged as the same which will mean that the article corresponding to the video signal SP' and different from the reference article is erroneously recognized as the same to the reference article.

In order to avoid such a defect, a clock pulse train, which is frequency-modulated different from the clock pulse SC with the constant frequency, is used. The number of the frequency-modulated clock pulses is not same in a unit time interval but is changed over time. Therefore, the number of the frequency-modulated pulses in a first time period T1 differs from that in a later time period T1 which is the same length as the former. Thus, the series pattern provided by counting the frequency-modulated clock pulses and representing the video signal SP' becomes different from the series pattern representing the reference video signal SP. Therefore, the above erroneous recognition can be avoided by using the frequency-modulated clock pulse train.

It will be apparent that the employment of a frequency-modulated clock pulse train performs the same effect for the other threshold levels.

Next, an embodiment of the apparatus of the invention which carries out the above methods will be described with reference to FIG. 3.

Figure 1:
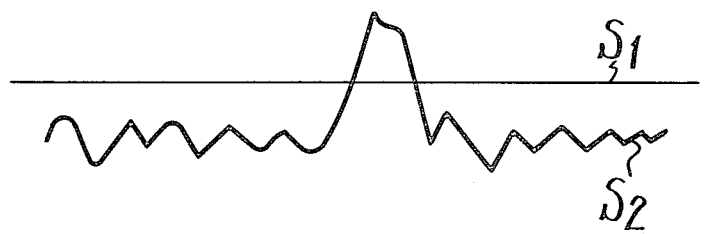
FIG. 1 is a waveform diagram used for explaining a prior art information processing method.
Figure 3:
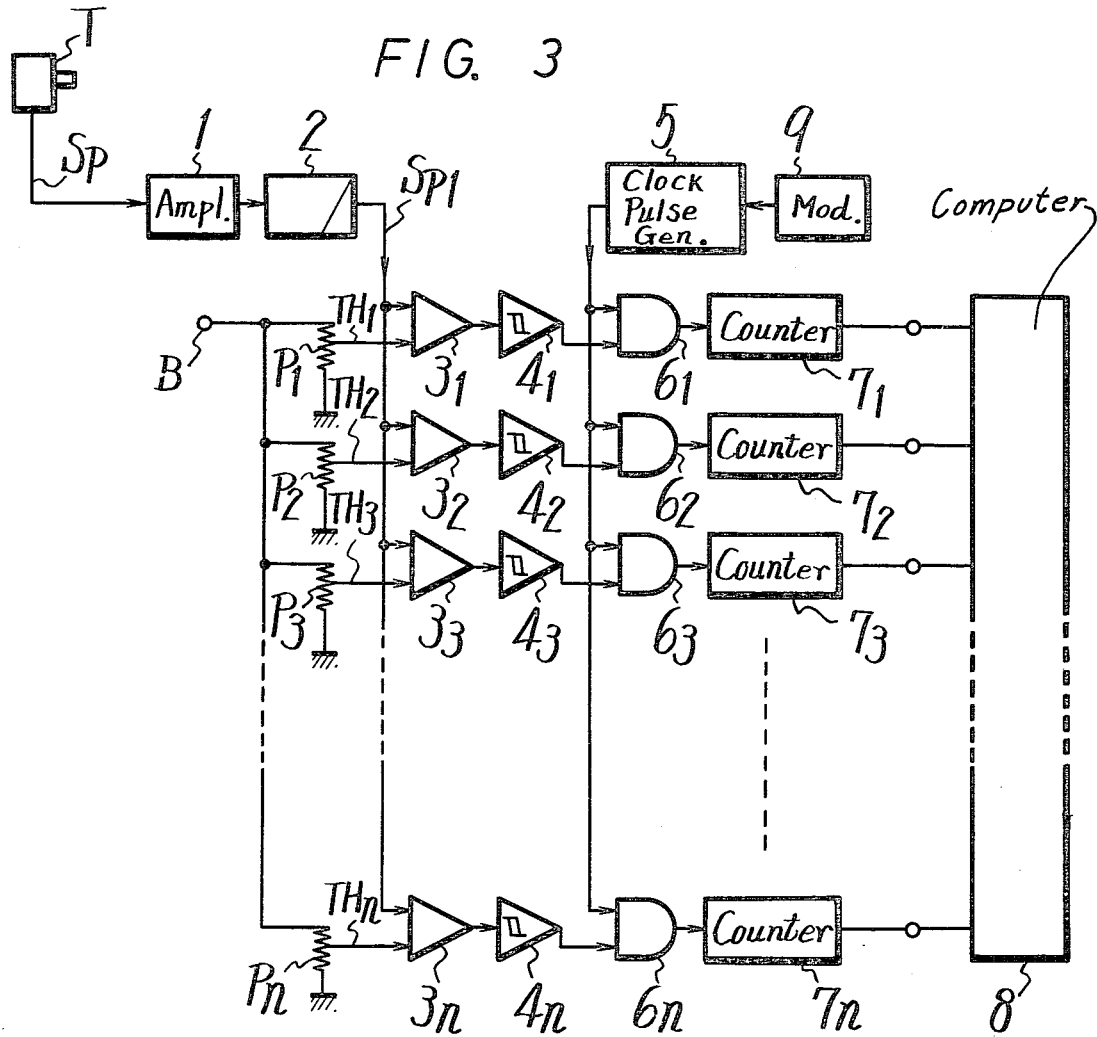
FIG. 3 is a schematic block diagram showing an example of the apparatus according to the invention which carries out the pattern information processing method of the invention.

In FIG. 3, reference letter T designates an image sensor such as a television camera. When, for example, a reference article or object (not shown) is picked up by the television camera T, it produces a reference video signal such as shown in FIG. 2A at SP. The video signal SP from the camera T is fed through an amplifier 1 such as an operational amplifier to a low pass filter 2 which serves to remove undesired noise components included in the amplified video signal SP and to produce a video signal SP1. The output signal SP1 from the low pass filter 2 is applied to one input terminal of each of level comparators $3_1, 3_2, 3_3, \ldots 3_n$. While the voltage from a reference voltage source B is applied to potentiometers P1, P2, P3, ... Pn which produce threshold values or levels TH1, TH2, TH3, ... THn, which are different from one another in level and whose levels are selected within the level range of the video signal SP1 from the low pass filter 2, respectively. The threshold levels TH1 to THn (which correspond to, for example, the threshold levels a to e shown in FIG. 2A) are applied to the other input terminals of the comparators $3_1$ to 3n, respectively. Therefore, the respective comparators $3_1$ to $3_n$ produce output signals during time intervals within which the video signal SP1 from the low pass filter 2 exceeds the respective threshold levels TH1 to THn set by the respective potentiometers P1 to Pn. The outputs from the level comparators $3_1$ to $3_n$ are fed through Schmitt trigger circuits $4_1, 4_2, 4_3, \ldots 4_n$ (which shape the rising-up portion of the waveform and produce signals corresponding to, for example, the signals a1 to e1 shown in FIG. 2C) to one input terminals of AND-circuits $6_1, 6_2, 6_3, \ldots 6_n$ which are supplied at their other input terminals with a clock pulse train with a constant frequency (refer to FIG. 2B) from a clock pulse generator 5. Thus, the AND-circuits $6_1$ to $6_n$ deliver output signals or clock pulse trains corresponding to, for example, those a2 to e2 shown in FIG. 2D. The output clock pulses from the AND-circuits $6_1$ to $6_n$ are respectively applied to counters $7_1, 7_2, 7_3, \ldots 7_n$ to be counted thereby. The counted results by the counters $7_1$ to $7_n$ are fed to a computer 8 which then provides a reference pattern information i.e. reference series pattern and memorizes the same therein.

Then an object to be inspected or recognized is picked up by the television camera T, the output video signal therefrom is processed similarly as above, its number series pattern is provided, and this number series pattern of the object to be inspected or recognized is compared with the reference series pattern in the computer 8 to judge whether the object is good or not. Thus, according to the apparatus of the invention described above, the object can be inspected or recognized accurately or the method of the invention set forth above can be effected correctly.

Since it is well known that the series pattern is processed by the computer 8, its detailed description will be omitted for the sake of brevity.

In FIG. 3, reference 9 designates a modulator such as a frequency modulator which controls the clock pulse generator 5 to produce therefrom a frequency-modulated clock pulse train. This frequency-modulated clock pulse train is used to perform the latter mentioned method of the invention as described above.

It will be apparent that many modifications and variations could be effected by those skilled in the art without departing from the spirits or scope of the novel concepts of the present invention, so that the spirits or scope of the invention should be determined by the appended claims only.

I claim as my invention:

1. A pattern information processing method comprising the steps of:
   (a) picking up an object by scanning with an image sensor to produce a video signal corresponding to said object;
   (b) dividing said video signal by a plurality of threshold levels which are different from one another;
   (c) gating clock pulse trains with said divided video signals to produce clock pulse trains corresponding to said plurality of threshold levels;
   (d) counting said clock pulse trains to provide a number series which represents a pattern of said scanned object; and
   (e) modulating said clock pulse train during said scanning whereby a number of said clock pulses counted in at least two different equal portions of said video signal differ from each other.

2. A pattern information processing method as claimed in claim 1, in which said modulating includes frequency modulating said clock pulse trains.

3. A pattern information processing apparatus comprising:
   (a) image sensor means for scanning an object to produce a video signal of said object;
   (b) means for providing a plurality of threshold levels which are different from one another;
   (c) means for dividing said video signal by said plurality of threshold levels to produce gate signals corresponding to said video signals divided by said plurality of threshold levels;
   (d) means for producing a clock pulse signal;
   (e) AND-means for separately gating said clock pulse signal by each of said gate signals;
   (f) means for counting said clock pulse signals from said AND-means and providing a number series which represents the scanned object; and
   (g) means for modulating said clock pulse signal during said scanning whereby a number of said clock pulses counted in at least two different equal portions of said video signal differ from each other.

4. A pattern information processing apparatus as claimed in claim 3, in which said means for modulating is a frequency modulator.

* * * * *